H. MAYER & G. SCHLATTER.
DETACHABLE WHEEL FOR MOTOR CARS.
APPLICATION FILED APR. 5, 1915.

1,142,113.

Patented June 8, 1915.

Inventors
Heinrich Mayer,
Gustav Schlatter,
By (signature) Atty.

UNITED STATES PATENT OFFICE.

HEINRICH MAYER AND GUSTAV SCHLATTER, OF ARBON, SWITZERLAND.

DETACHABLE WHEEL FOR MOTOR-CARS.

1,142,113.  Specification of Letters Patent.  Patented June 8, 1915.

Application filed April 5, 1915. Serial No. 19,404.

*To all whom it may concern:*

Be it known that we, HEINRICH MAYER and GUSTAV SCHLATTER, citizens of the German Empire, and residing at Arbon, Switzerland, have invented certain new and useful Improvements in Detachable Wheels for Motor-Cars, of which the following is a specification.

This invention relates to detachable wheels for motor-cars and the like.

The improvements which have to be constantly made by motor-car engineers in freight and other cars in order to meet the constantly increasing requirements as regards reliability, low cost of running and good profit have frequently rendered it necessary to waive advantages attaching to an earlier mode of construction when it appeared advisable to employ another construction having some advantage attached to it.

The object of this invention is to obviate this drawback. To this end, the driving wheel of a motor-car is detachably mounted on and positively connected to a rotatable collar or internal hub and is coupled by means of a driving disk with the driving shaft, and the invention substantially consists in the clutch connecting the driving wheel with the driving disk being constructed in such a manner that power is transmitted by the driving shaft directly to the wheel (not first to the rotatable collar or internal hub and by this to the wheel) without the possibility of removing the wheel by itself and the driving shaft by itself independently of one another being impaired.

To form the parts in question in such a manner that a wheel can be removed independently of the shaft and conversely is well known. It has also been proposed to transmit the power directly from the shaft to the wheel, but then it was always necessary heretofore to dispense with the independent removability of the two parts because it was necessary, when detaching the wheel, to remove the shaft first or a part thereof.

According to the invention this defect is obviated by making each member detachable by itself independently of the other, even when the driving shaft is directly coupled with the car wheel. At the same time provision is made that the two removable parts can be conveniently detached. Also, the improved arrangement enables the wheel and the shaft to be detached without their being impeded by the rotatable collar and in such a manner that the connection with the collar always remains intact after the removal of the wheel or shaft.

One constructional form of the invention is represented by way of example in the accompanying drawing, wherein:—

Figure 1:
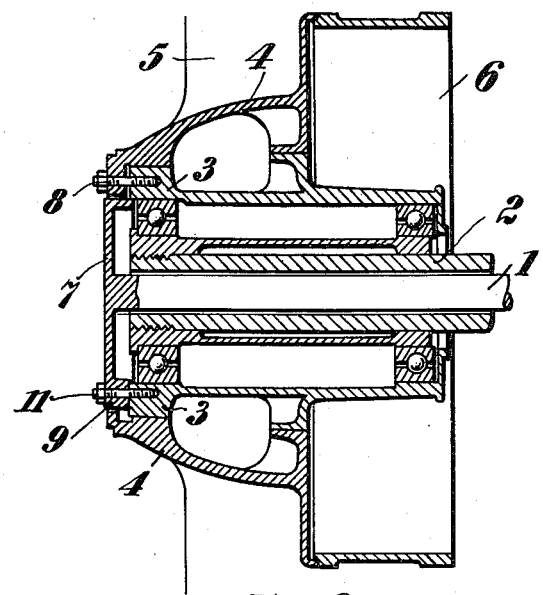
Figure 2:
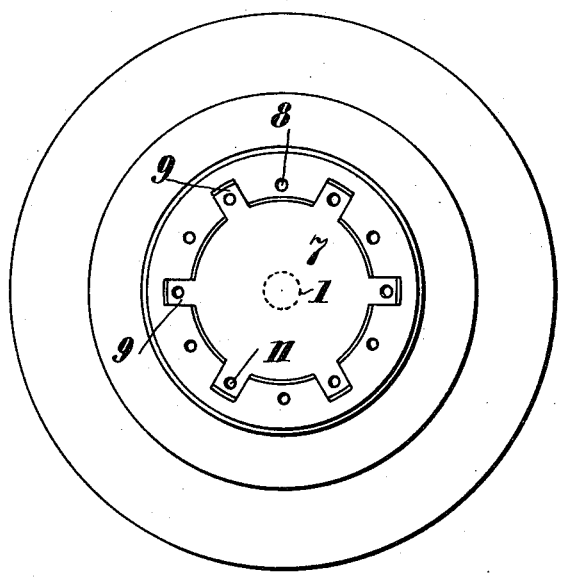

Figure 1 is a longitudinal section taken in the direction of the axis of the rear wheel, and Fig. 2 is an end elevation.

Referring to the drawing, 1 denotes the driving shaft, 2 the rear axle casing, and 3 the rotatable collar or inner hub-member or part mounted on ball-bearings 13. The wheel having an outer hub-member or part 4, spokes 5 and the brake drum 6 attached thereto is detachably mounted on the collar 3. The lugs or arms 9 of the driving disk or head 7 on the end of the driving shaft 1 take into corresponding recesses or notches in the hub 4, whereby the driving shaft and the wheel are directly coupled together. In addition, the shaft is positively connected by screws 11 with the collar 3, and likewise the hub 4 by screws 8. A sleeve 12 is rigidly secured to the axle casing 2 and the ball bearings 13 are arranged between this sleeve and the inner hub-member 3.

The described connection is such that after the screws 8 have been removed the car wheel can be detached, while after the screws 11 have been removed the shaft 1 is detachable, and in both cases the part not detached remains connected with the inner hub-member or rotatable collar 3.

We claim:—

1. In a device of the class described, an axle casing, a driving shaft therein, an inner hub-part rotatable with respect to said casing, an outer hub-part detachably mounted on the inner hub-part, a driving head on said shaft having arms, an inwardly directed flange on said outer hub-part notched to correspond to said arms and engaged thereby, means securing the outer hub-part to the inner hub-part and means securing said arms to the inner hub-part.

2. In a device of the class described, an axle casing, a driving shaft therein, an inner hub part rotatable with respect to said casing, an outer hub part detachably mounted on the inner hub part, said inner hub part having a flat outer end and said outer hub part having a notched flange overlapping said flat end, a flat spider on said shaft having radial arms interfitting with said notched flange and lying against the flat end of said inner hub part and means for
5 securing the outer hub part to the inner hub part, and means securing the spider arms to said inner hub part.

In testimony whereof, we affix our signatures in the presence of two witnesses.

HEINRICH MAYER.
GUSTAV SCHLATTER.

Witnesses:
 FRANK TIMMKE,
 EMIL MEILE.